United States Patent
Chamma et al.

(10) Patent No.: US 12,197,526 B1
(45) Date of Patent: Jan. 14, 2025

(54) SURFACE-BASED ZONE CREATION

(71) Applicant: Content Square SAS, Paris (FR)

(72) Inventors: David Chamma, Paris (FR); Xavier Coutin, Paris (FR); Gregory Riberon, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/756,965

(22) Filed: Jun. 27, 2024

(51) Int. Cl.
*G06F 17/00* (2019.01)
*G06F 16/957* (2019.01)
*G06F 16/958* (2019.01)

(52) U.S. Cl.
CPC .......... *G06F 16/957* (2019.01); *G06F 16/958* (2019.01)

(58) Field of Classification Search
CPC .............................. G06F 16/957; G06F 16/958
See application file for complete search history.

(56) References Cited

U.S. PATENT DOCUMENTS

| | | | | |
|---|---|---|---|---|
| 11,100,069 | B2 * | 8/2021 | Harris | G06F 16/955 |
| 11,741,186 | B1 * | 8/2023 | Frikha | G06F 11/3476 |
| | | | | 715/234 |
| 12,047,465 | B1 * | 7/2024 | Giovangrandi | H04L 67/535 |
| 2018/0143951 | A1 * | 5/2018 | Oh | G06T 11/206 |
| 2018/0173385 | A1 * | 6/2018 | Zhang | G06Q 10/0637 |
| 2019/0205021 | A1 * | 7/2019 | Kim | G06F 3/04845 |
| 2021/0089710 | A1 * | 3/2021 | Chernov | G06V 30/413 |
| 2021/0326497 | A1 * | 10/2021 | Geldard | G06F 18/22 |
| 2022/0043879 | A1 * | 2/2022 | Trigalo | G06F 40/166 |
| 2023/0334226 | A1 * | 10/2023 | Barker | G06F 40/177 |
| 2023/0350922 | A1 * | 11/2023 | Baatout | G06F 16/958 |
| 2024/0220565 | A1 * | 7/2024 | Guo | H04L 67/146 |
| 2024/0281476 | A1 * | 8/2024 | Patt | H04L 9/3213 |

FOREIGN PATENT DOCUMENTS

| | | | | |
|---|---|---|---|---|
| WO | WO-2018053620 A1 * | 3/2018 | | G06F 16/00 |
| WO | WO-2022018492 A1 * | 1/2022 | | G06F 16/958 |
| WO | WO-2024064229 A1 * | 3/2024 | | G06F 3/013 |

OTHER PUBLICATIONS

Figueiredo, Leandro Neiva Lopes, "A Rendering-based Method for Selecting the Main Data Region in Web Pages", 2014 9th Latin American Web Congress, Oct. 1, 2014, pp. 24-32. (Year: 2014).*

* cited by examiner

*Primary Examiner* — Laurie A Ries
(74) *Attorney, Agent, or Firm* — Schwegman Lundberg & Woessner, P.A.

(57) ABSTRACT

Aspects of the present disclosure involve a system comprising a computer-readable storage medium storing a program and method for surface-based zone creation. The program and method provide for receiving a snapshot of a webpage, the snapshot depicting a plurality of elements; determining coordinates and dimensions for each of the plurality of elements; identifying, using the coordinates and dimensions for each of the plurality of elements, parent-child relationships within the webpage, based on a first requirement that a child element has a threshold amount of overlap with a parent element, and based on a second requirement that the child element has a smaller area than that of the parent element; and determining zones for the webpage based on the identifying, the zones being usable to perform zoning metrics with respect to the webpage.

20 Claims, 11 Drawing Sheets

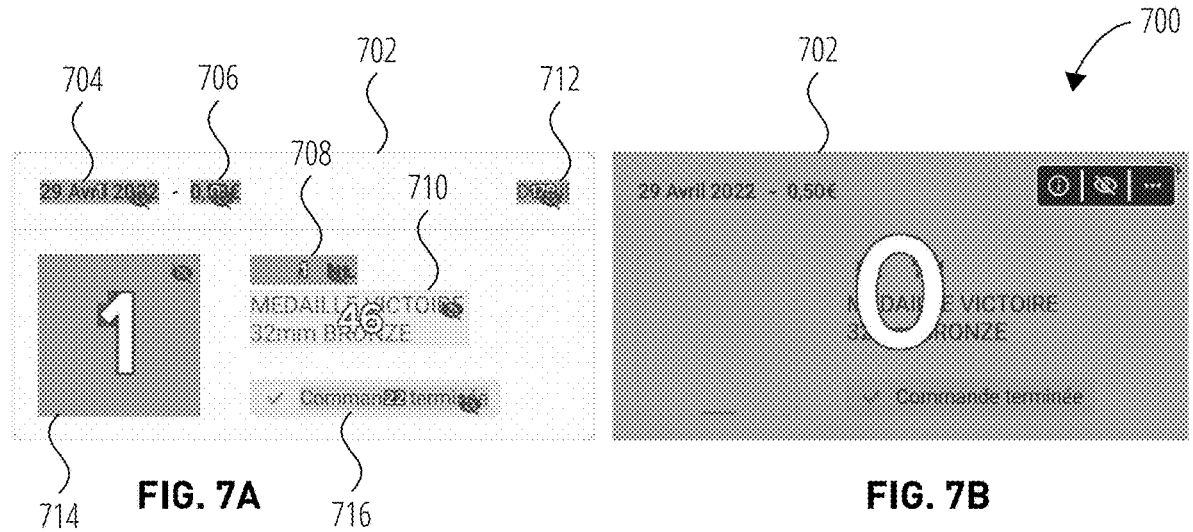
FIG. 7A  FIG. 7B
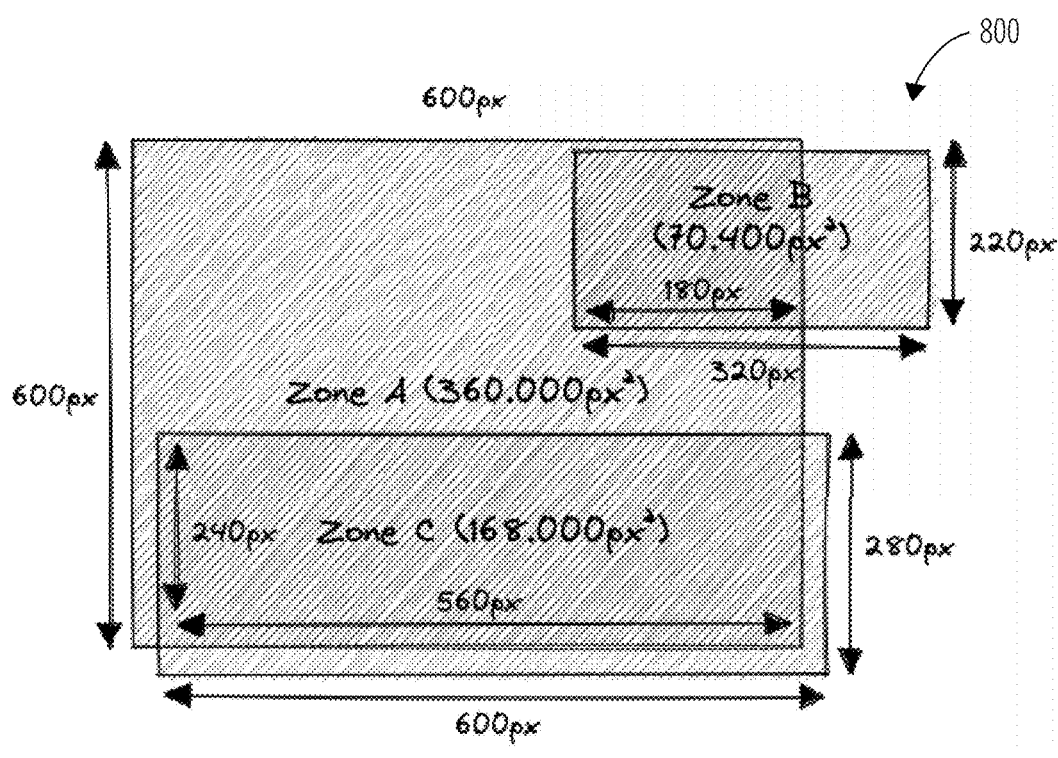
FIG. 8

SURFACE-BASED ZONE CREATION

BACKGROUND

Web analysis solutions provide for the collection and analysis of website data. Such solutions may provide for capturing user interaction with respect to webpage visits.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIGS. 7A-7B illustrate an example of two views of different elements of snapshot area of a webpage, in accordance with some examples.

FIG. 8 illustrates an example of identifying parent-child relationships based on overlap and size of the surface area of elements, in accordance with some examples.

DETAILED DESCRIPTION

Web analysis solutions provide for the collection and analysis of website data. Example web analysis tools include the tracking and recording of session events corresponding to user interactions, automated website zone or element identification, session replay, statistical analysis of collected data, and the like.

The disclosed embodiments provide for an experience analytics system that receives a snapshot of a webpage, where the webpage includes multiple elements. For example, the "snapshot" refers to a captured view of the webpage, and may be generated based on stored session events provided by a customer client device. The experience analytics system determines coordinates (e.g., x, y) and dimensions (width, height) for each of the elements of the webpage.

The experience analytics system identifies, using the coordinates and dimensions for each element, parent-child relationships within the webpage. For example, the experience analytics system checks identifies an element as a child if the following conditions are met: (1) there is an area overlap between the element and the "parent" element that is greater or equal to a predefined threshold value (e.g., 80%) of its area; (2) the element is smaller than the "parent" element area; and (3) the element is in the same group (e.g., a scrollable group or not scrollable group) as the "parent" element.

The experience analytics system determines zones for the webpage based on the identified parent-child relationships. The zones are usable to perform zoning metrics with respect to the webpage.

Networked Computing Environment

Figure 1:
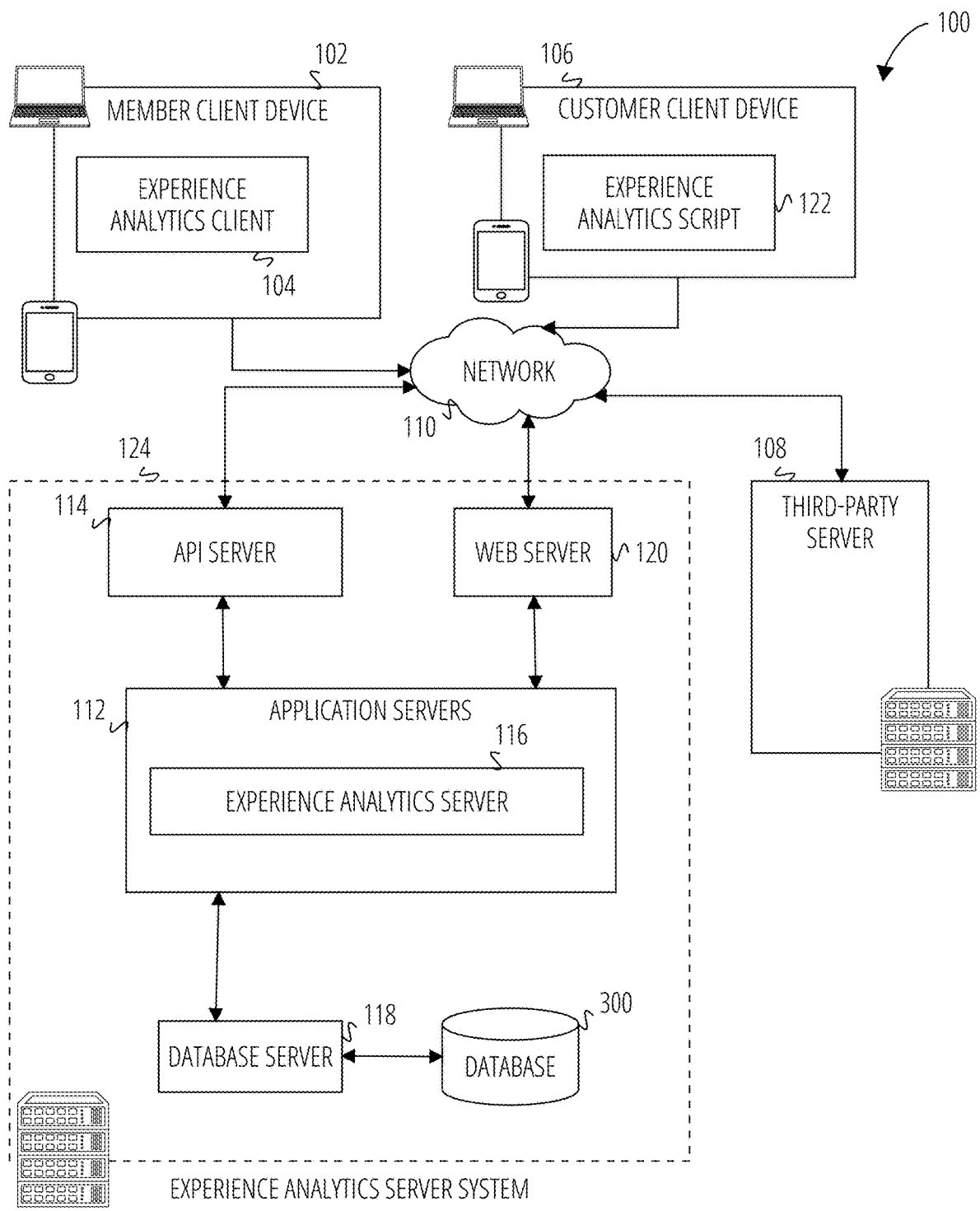
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, feedback provided by the user into feedback forms or widgets on the website, etc. Other processor and memory intensive processing of data may also be performed server-side by the experience analytics server 116, in view of the hardware requirements for such processing.

System Architecture

Figure 2:
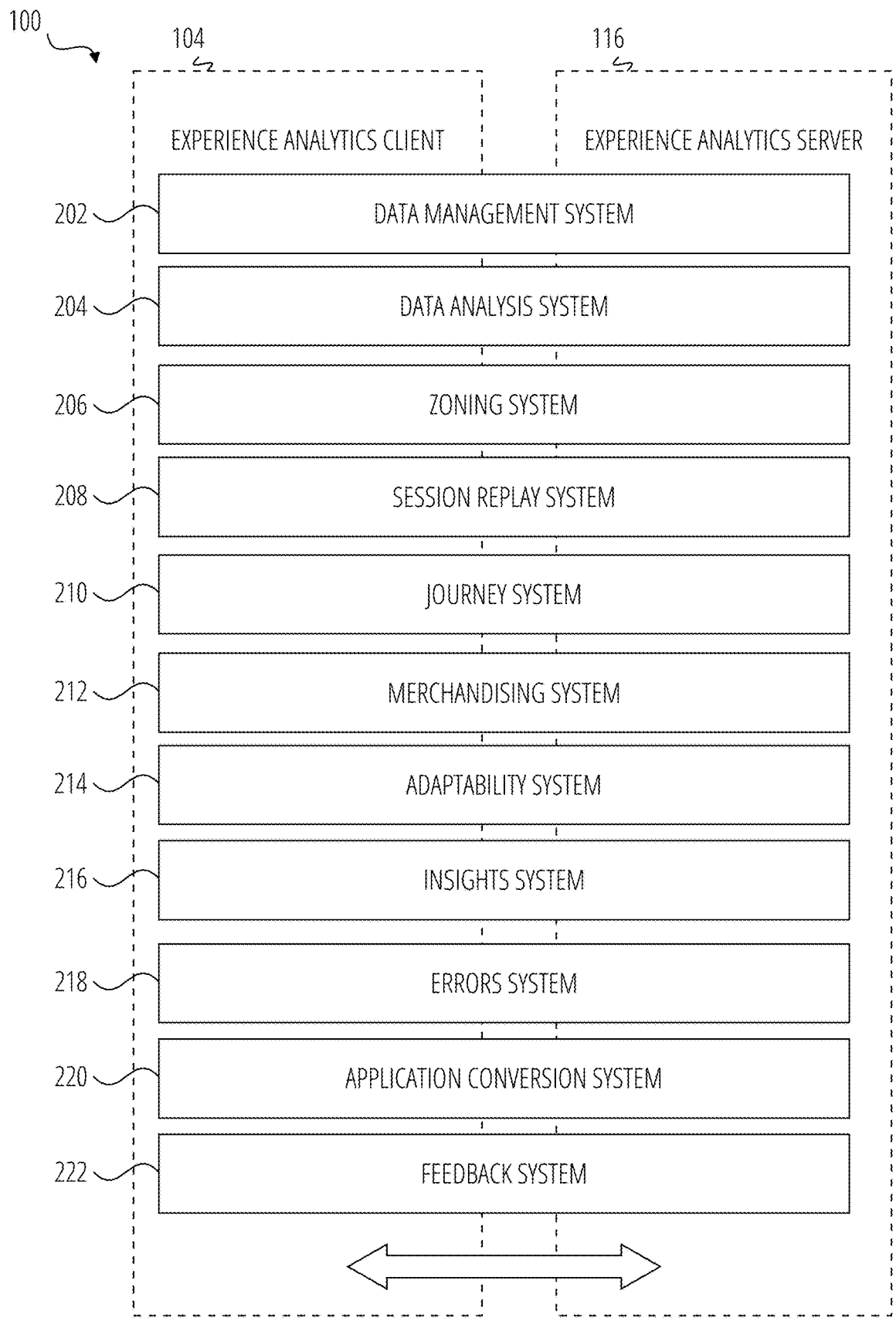
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages in the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for visitors that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

The feedback system 222 is responsible for receiving and analyzing data from the data management system 202 that includes the feedback data received from the client devices. As the visitor progresses through a client's website on the client device, a feedback webpage of the website, a pop-up window or tab, or an overlay can be displayed to receive the visitor's feedback. For instance, a feedback form can be displayed in a pop-up window or tab of the website, an overlay of the website, one of the plurality of webpages of the website, etc. The visitor can provide feedback on, for example, the functionality of the website, aesthetics of the website, on the goods and services associated with the website, etc. The feedback data can include a text input that is included into a feedback form on the website. The feedback data can also include a survey response, a rating that includes an image, an emoticon, or an icon, a screenshot of one of the plurality of webpages, etc. The feedback system 222 is also responsible for generating feedback interfaces to be displayed by the member client device 102 via the experience analytics client 104.

Data Architecture

Figure 3:
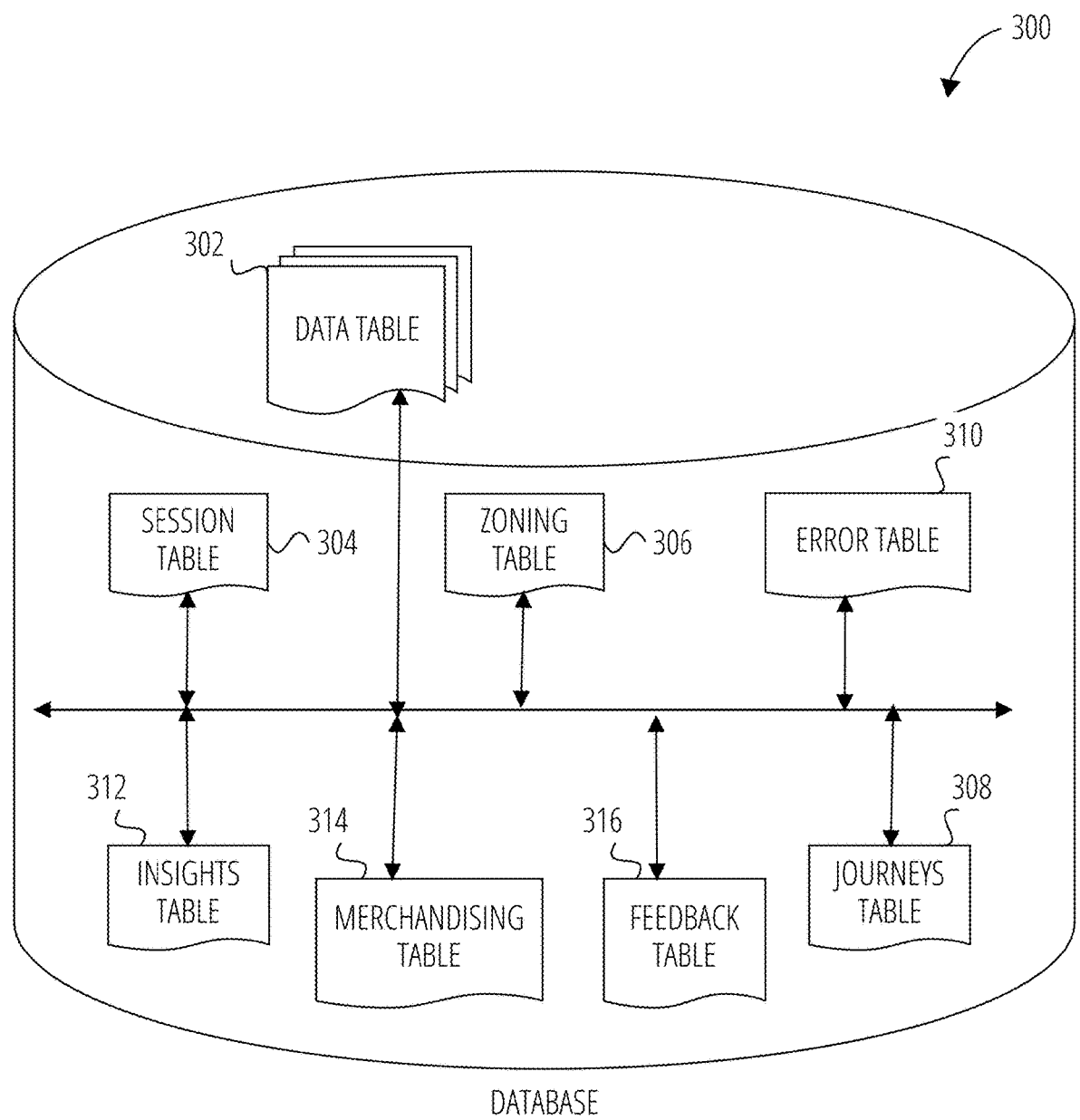
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

The feedback table 316 stores data associated with the feedback system 222. For example, the data in the feedback table 316 can include the feedback data received from each of the customer client devices 106 and stored in association with the customer client device 106 and the website associated with the customer client device 106. The feedback data can include, for example, the text input that provides the visitor's (or customer's) feedback on the website, survey response, rating that includes an image, an emoticon, or an icon, a screenshot of one of the plurality of webpages, etc.

Figure 4:
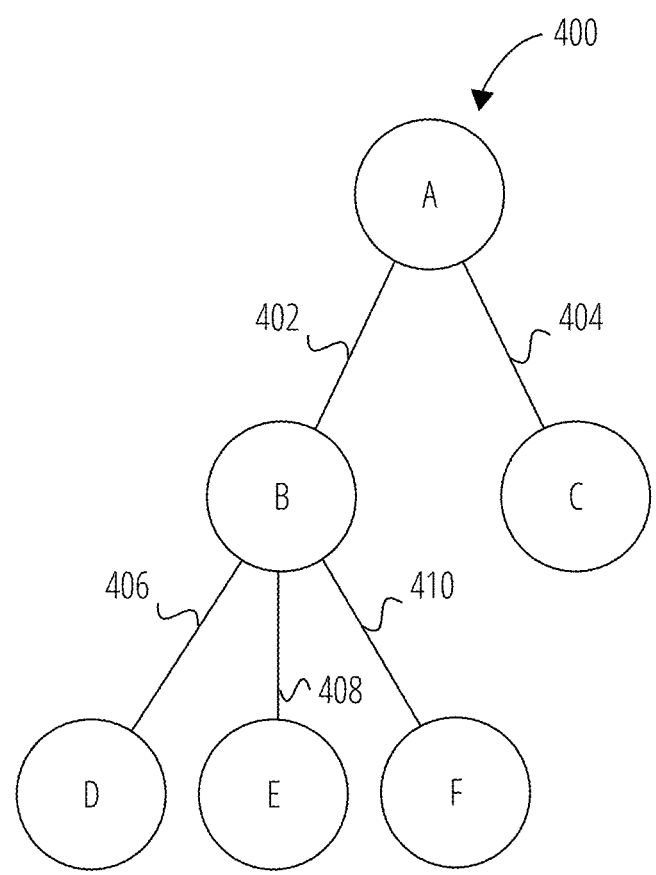
FIG. 4 illustrates an unlabeled document object model (DOM) tree, in accordance with some examples.

FIG. 4 illustrates an unlabeled document object model (DOM) tree 400, in accordance with some examples. In one or more embodiments, the DOM tree 400 provides a visual representation of the hierarchical structure of a webpage's HTML code, with content zones or elements (e.g., as defined by the zoning system 206) represented as nodes A-F.

In the example DOM tree 400, related nodes A-F are joined by links 402-410, representing the relationships between any two of the nodes A-F. In the example DOM tree 400, a link 402 is established between nodes A and B, a link 404 is established between nodes A and C, a link 406 is established between nodes B and D, a link 408 is established between nodes B and E, and a link 410 is established between nodes B and F.

In addition, nodes B and C are disposed on a second tier below the first tier occupied by node A, reflecting a structure in which the content element or zone represented by node A includes the content elements or zones represented by nodes B and C. Moreover, nodes D, E and F are disposed on a third tier below the second tier occupied by node B, reflecting a structure in which the content element or zone represented by node B includes the content elements or zones represented by nodes D, E and F.

Figure 5:
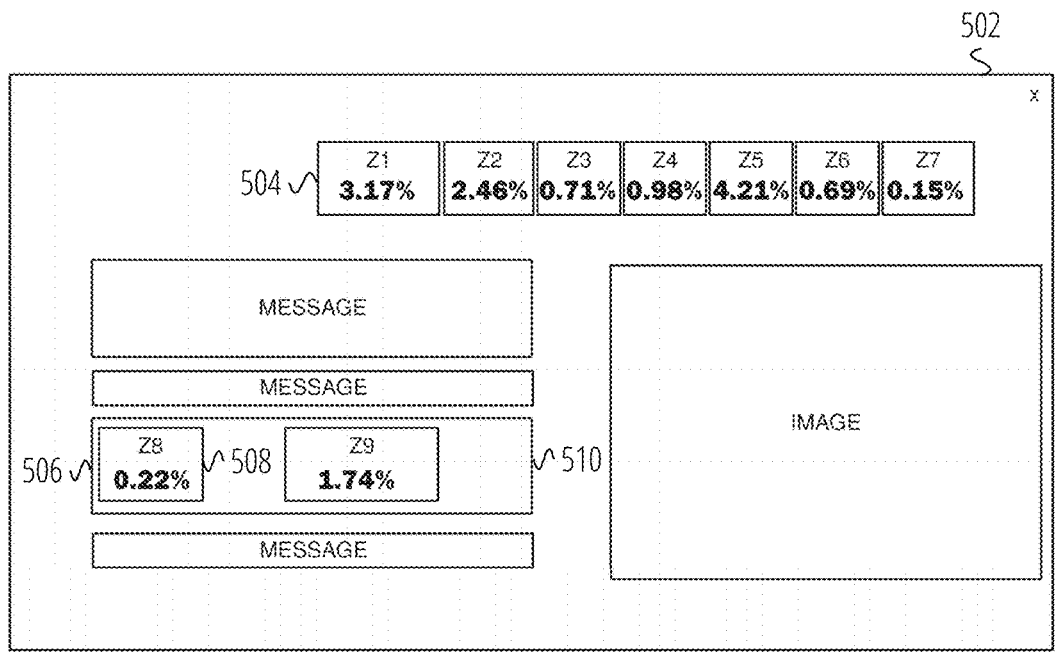
FIG. 5 is a user interface for presenting a webpage with performance information for zones in a webpage, in accordance with some examples.

FIG. 5 is a user interface 502 for presenting a webpage with performance information for zones in a webpage, in accordance with some examples. As described herein, a "zone" is a webpage feature or element included in the HTML of the webpage, and may correspond to a space on a webpage that holds content together. Examples of zones in webpages include, but are not limited to, banner advertisements, product images, clickable buttons, and the like.

Zoning metrics refer to various quantifiable factors related to goal achievement. As an example, where a given goal targets a fifteen percent newsletter sign-up rate, a corresponding performance metric may be the percentage of site visitors clicking on a "subscribe to newsletter" button. An example metric of interest is an "average hover time," describing the average amount of time for which users hover the mouse cursor over given elements of the webpage.

With regard to zones (e.g., zones 504, 506, 508, 510), zoning metrics may be overlaid on the zones for ease of comparison between zones. The zoning metrics include hover rate, click recurrence, attractiveness rate, exposure rate, and exposure time, but other zoning metrics may also be included.

The hover rate is an average time spent hovering over the zone. The click recurrence is the average number of clicks on the zone for page views with at least one click on the zone. The attractiveness rate is the percentage of page views where the zone was visible on the screen with at least one click on the zone. The exposure rate is the percentage of page views where at least half of the zone was visible on the screen, and the exposure rate indicates how far the users are scrolling. Further, the exposure time is the average time with at least half of the zone is visible on the screen and indicates how long the zone is visible.

In the illustrated example in FIG. 5, the click recurrence for each zone is shown over imposed over the zone. For example, zone 504 shows that 2.34% of the users that view the zone click on the zone. Zones may also include other zones within, such as zone 506 that includes zone 508 (click recurrence of 0.22%) and zone 510 (click recurrence of 1.74%).

Regarding the exposure rate, in some example embodiments, the test of whether a user views the zone is that the user views at least a threshold portion of the zone. For example, viewing the zone may correspond with viewing the top half of the zone, corresponding to the vertical middle point of the zone is exposed to the user. The threshold may be configured by the user.

Figure 6:
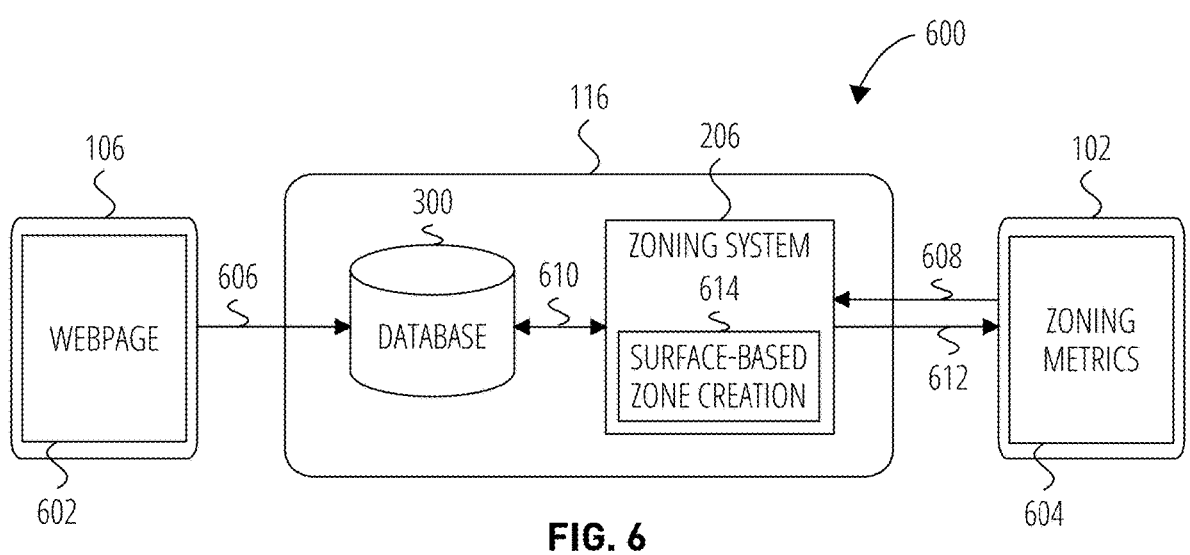
FIG. 6 illustrates an architecture for surface-based zone creation, in accordance with some examples.

FIG. 6 illustrates an architecture 600 for surface-based zone creation, in accordance with some examples. For explanatory purposes, the architecture 600 is primarily described herein with reference to the member client device 102, the customer client device 106 and the experience analytics server 116 of FIG. 1. However, the architecture 600 may correspond to one or more other components and/or other suitable devices.

In the example of FIG. 6, a user (e.g., customer) at the customer client device 106 accesses a website including a webpage 602. The user interacts with the webpage 602, with such interactions corresponding to session events performed with respect to the webpage 602. As noted above, the session events may include entering text in a text box, clicking a button with a mouse, tapping a button with a touchscreen, scrolling up or down on the webpage 602, hovering over a webpage element, and the like.

In one or more embodiments, the experience analytics script 122 of the customer client device 106 is configured to track the session events. For example, the experience analytics script 122 may be implemented in part as a tracking tag for the webpage 602, for tracking the session events within the webpage 602.

At operation 606, the customer client device 106 provides the session events to a pipeline, for example, in a serialized format. The experience analytics server 116 is configured to receive the serialized session events, and to store the session events in the database 300.

In the example of FIG. 6, operation 606 corresponds to a first phase which relates to storing session events (e.g., user interactions) for the webpage 602. Moreover, operations 608-612 correspond to a second phase which relates to presenting corresponding zoning metrics 604 (e.g., hover rate, click recurrence, attractiveness rate, exposure rate and/or exposure time for each zone) based on the session events of the webpage 602. It may be understood that the second phase may occur shortly after the first phase, or after an extended period of time after the first phase.

Regarding the second phase, a member user at the member client device 102 may request (e.g., via user input) to view the zoning metrics 604 for the webpage (e.g., as overlays on respective zones). In response, the member client device 102 provides a request to the experience analytics server 116 for the zoning metrics 604 (operation 608). In response to the receiving the request, the zoning system 206 of the experience analytics server 116 accesses the serialized session events stored in the database 300 (operation 610).

Moreover, the experience analytics server 116 provides for unserializing the session events. The experience analytics server 116 in conjunction with the zoning system 206 is configured to determine the zoning metrics 604 for zones of the webpage 602 based on the unserialized data.

To determine the zoning metrics 604 for the webpage 602, the zoning system 206 first identifies the zones for the webpage 602. As noted above, a "zone" is a webpage feature or element included in the HTML of the webpage 602.

In this regard, the zoning system 206 includes a surface-based zone creation module 614 for creating zones, based on the surface area of elements as presented within a snapshot the webpage 602. As described herein, a "snapshot" refers to a captured view of a webpage. A viewport shows the part of the snapshot that was visible on the display of the customer client device 106. In example embodiments, a snapshot may be generated based on the session events provided by the customer client device 106 to the database 300 at operation 606.

As discussed further below with respect to FIG. 8, the surface-based zone creation module 614 is configured to use the data (e.g., session events) of the snapshot to create zones for the elements of the webpage 602. For example, the surface-based zone creation module 614 determines, from data of the session events, coordinates and dimensions each of elements in the snapshot of the webpage 602. Using the coordinates and dimensions, the surface-based zone creation module 614 identifies parent-child relationships for the webpage.

The surface-based zone creation module 614 checks for predefined conditions in order to identify parent-child relationships. For example, a first condition is that a child element has a threshold amount of overlap (e.g., 80%) with a parent element with respect to surface area. A second condition is that the child element has a smaller surface area than that of the parent element. A third condition is that the child element and the parent element both be scrollable or both be not scrollable.

In example embodiments, the surface-based zone creation module 614 requires that all of the first, second and third conditions be met in order to identify a parent-child relationship between two elements. However, based on administrator settings, it is possible for the surface-based zone creation module 614 to only require that a subset of the conditions (e.g., the first and second conditions, but not the third condition) be met, or for different conditions to be met.

In example embodiments, the surface-based zone creation module 614 determines zones based on the identified child and parent relationships in the webpage 602. For each zone as created by the surface-based zone creation module 614, the zoning system 206 is configured to determine respective zoning metrics 604 for that zone. After determining zoning metrics 604, the zoning system 206 sends an indication of the zoning metrics 604 to the member client device 102 (operation 612). In response, the member client device 102 provides for display of the zoning metrics 604. For example, the zoning metrics 604 are presented as overlays with respect to a representation of the webpage 602 displayed on the member client device 102.

While the example of FIG. 6 is depicted as a single customer client device 106, it is possible that the experience analytics server 116 provides for aggregating session events (e.g., serialized session events) from multiple customer client devices 106. The aggregated data is stored in the database 300, and is usable by the zoning system 206 to present zoning metrics 604 with respect to the plural customer client devices 106. In addition, the experience analytics server 116 may provide a user interface for a member at the member client device 102 to specify a time period (e.g., the last day, week, month, or specified date range) for determining the zoning metrics 604.

FIGS. 7A-7B illustrate an example of two views of different elements of snapshot area 700 of a webpage, in accordance with some examples. In example embodiments, it is possible for zones to be visually overlapped, but not to have a parent-child relationship defined within the DOM. In a reverse example, it is also possible for zones that are not visually overlapping to have a parent-child relationship defined within the DOM.

The example of FIGS. 7A-7B illustrates an example problem in which zoning metrics for overlapping zones are inaccurately aggregated. In the example of FIG. 7A, the snapshot area 700 includes element 702, which is larger than and overlaps elements 704, 706, 708, 710, 712, 714 and 716. As shown in FIG. 7A, zoning metrics (e.g., clicks) are displayed with respect to element 714 (e.g., 1 click) and element 710 (e.g., 46 clicks).

However, the zoning metrics of element 714 and element 710 are not aggregated with respect to element 702 in the snapshot area 700 for FIG. 7B. As shown in FIG. 7B, the zoning metrics indicate a value of 0 (e.g., 0 clicks) for element 702. In this regard, FIG. 7B may identify parent-child relationships based on a tree view of the webpage, and therefore not identify elements 704-716 as children of parent element 702.

As such, as shown in the examples of FIGS. 7A-7B, zoning metrics may be inaccurately aggregated with respect to zones that are created based solely on parent-child relationships as defined by the DOM of the webpage. The surface-based zone creation module 614 is configured to create zones based on surface area, for improved accuracy with respect to aggregating zoning metrics.

FIG. 8 illustrates an example of identifying parent-child relationships based on overlap and size of the surface area of elements, in accordance with some examples. In example embodiments, surface-based zone creation module 614 is configured to calculate coordinates (x, y) and dimensions (width, height) or all elements from the snapshot of a webpage.

For example, the surface-based zone creation module 614 implements or otherwise accesses DomRect functions, which is configured to describe the size and position of a given element (e.g., rectangle). For a given element (e.g., rectangle or DOMRect) in the snapshot of the webpage, the surface-based zone creation module 614 is configured to calculate the following: DOMRectReadOnly.x (e.g., the x coordinate of the DOMRect's origin, typically the top-left corner of the rectangle; DOMRectReadOnly.y (e.g., the y coordinate of the DOMRect's origin, typically the top-left corner of the rectangle; DOMRectReadOnly.width (e.g., the width of the DOMRect); and DOMRectReadOnly.height (e.g., the height of the DOMRect).

Thus, the surface-based zone creation module 614 is configured to determine zoning for each element within the snapshot of a webpage. When a given element is selected to be zoned, the surface-based zone creation module 614 is configured to calculate the coordinates and dimensions of the element and to compare them to all elements of the snapshot, in order to determine parent-child relationships between elements of the webpage.

In example embodiments, the surface-based zone creation module 614 determines that an element is considered as a child if it satisfies all of the following conditions: (1) there is an area overlap between the element and the "parent" element that is greater or equal to a predefined threshold value (e.g., 80%) of its area; (2) the element is smaller than the "parent" element area; and (3) the element is in the same group (e.g., scrollable group or not scrollable group) as the "parent" element.

With respect to condition (3), a "scrollable group" refers to all elements that are scrollable or inside a scrollable ancestor, and a "not scrollable group" refers to all elements that are neither scrollable nor inside a scrollable ancestor. In example embodiments, an element is considered as scrollable if its scrollHeight is larger than its clientHeight (e.g., with scrollHeight and clientHeight being respective functions implemented or accessible by the surface-based zone creation module 614). In other words, an element is considered as scrollable if the content height of the element is larger than the element height.

In example embodiments, the predefined threshold value for overlap may be separate (e.g., different) for each snapshot. For example, an administrator of the experience analytics system 100 or a user of the member client device 102 may set a respective threshold value for each snapshot. In addition, the threshold value is stored in the database 300 (e.g., within the zoning table 306). Each threshold value can be updated for a snapshot, or for a project using new API endpoints (e.g., authorized to administrators of the experience analytics system 100).

Thus, given a threshold value T, a zone will be considered as a child of another zone, if the area of their intersection represents at least T % of the area of the child zone. As shown in the example of FIG. 8, the snapshot 800 has 3 zones, namely Zone A, Zone B and Zone C. Each of Zones A to C have different values with respect to area.

The inclusion (e.g., overlap) percentage of Zone B in Zone A is (220 px*180 px)/70.400 px$^2$≈51%. On the other hand, the inclusion percentage of Zone C in Zone A is (240 px*560 px)/168.000 px$^2$≈80%. If the threshold value T is set to 50%, then both Zone B and Zone C are considered to be children of Zone A. If the threshold value T is set to 75%, then Zone B is considered to be a child of Zone A, but Zone C is not considered to be a child of Zone A.

Figure 9:
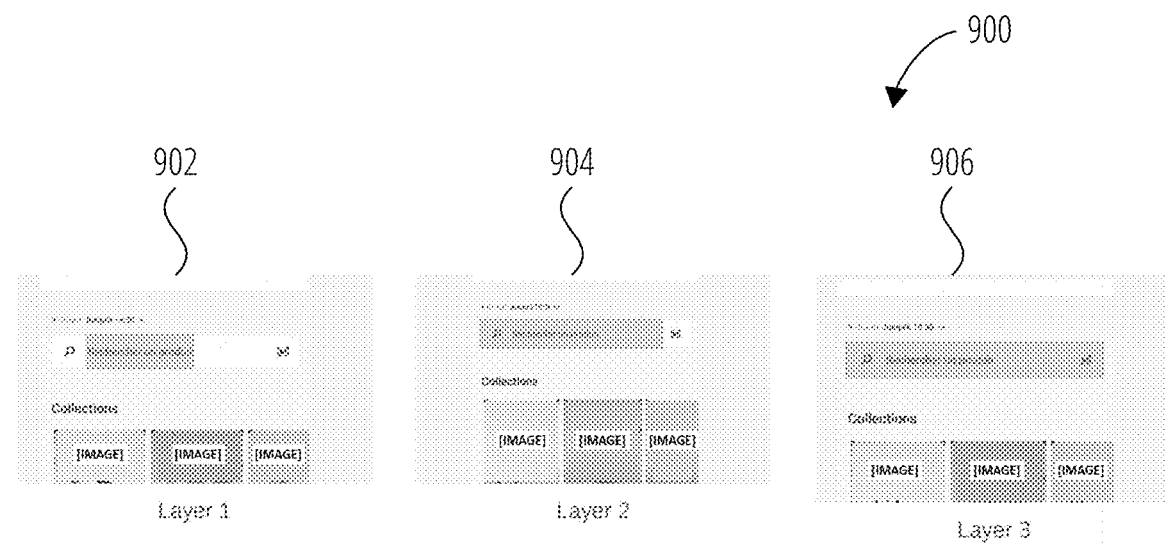
FIG. 9 illustrates a user interface for navigating between zones of a webpage, in accordance with some examples.

FIG. 9 illustrates a user interface 900 for navigating between zones of a webpage, in accordance with some examples. In example embodiments, the surface-based zone creation module 614 provides a zone navigation tool for selecting and/or creating (e.g., editing) zones with respect to a user interface 900 of a webpage. As noted above, the zones are created based on identifying parent-child relationships between webpage elements.

In the example of FIG. 9, the user interface 900 is depicted as having multiple layers, with each layer representing different webpage elements. As shown, FIG. 9 depicts a first layer 902, a second layer 904 and a third layer 906.

In example embodiments, the zone navigation tool provides for selecting zones based on surface area. As noted above, the surface-based zone creation module 614 is configured to implement/access DomRect function(s) to determine the surface area of elements. The zone navigation tool is configured to automatically select the smallest element (e.g., using surface area) that is under the cursor (e.g., or touch input) position provided by the user. The surface-based zone creation module 614 provides for selecting the next largest element (e.g., corresponding to the next layer) in response to predefined user input.

For example, the predefined user input is selection of the up arrow (e.g., keyboard up, tap input of an up arrow) to select the next smallest element. In addition, selection of the down arrow (e.g., keyboard down, tap input of a down arrow) selects the prior smallest element. In the example of FIG. 9, the selected element is smallest in the first layer 902, the selected element is the second smallest in the second layer 904, and the selected element is the third smallest in the third layer 906.

Figure 10A:
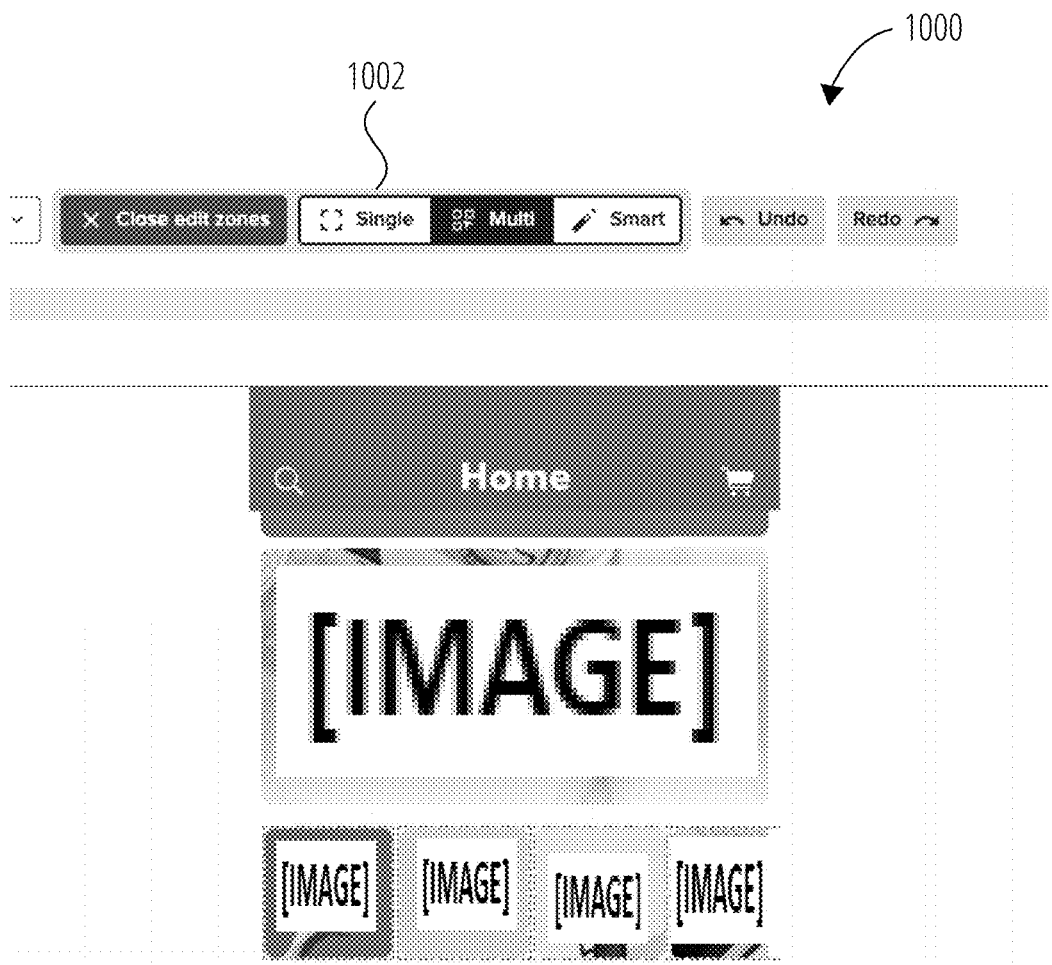
FIGS. 10A-10B illustrate a user interface for toggling between zone selection modes, in accordance with some examples.
Figure 10B:
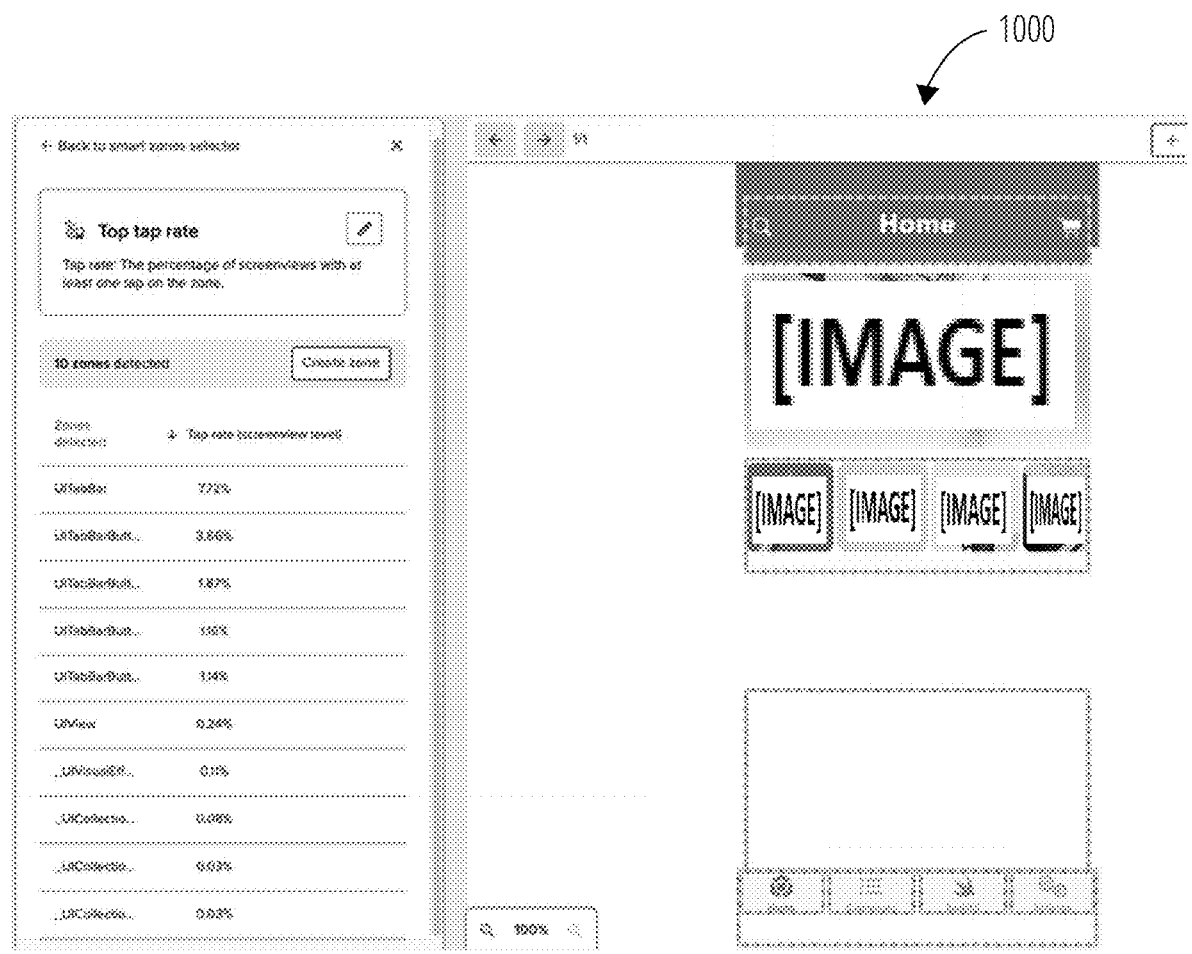

FIGS. 10A-10B illustrate a user interface 1000 for toggling between zone selection modes, in accordance with some examples. As noted above, the surface-based zone creation module 614 provides a zone navigation tool for selecting and creating (e.g., editing) zones. In example embodiments, the zone navigation tool includes a toolbar with a tab interface 1002 for toggling between different zone selection modes. The zone selection modes include a single zone selection mode, a multi-zone selection mode, and a smart zone selection mode.

In example embodiments, the single zone selection mode works as described above with respect to FIG. 9. In this mode, the surface-based zone creation module 614 automatically selects the smallest element under the cursor, and the user can select the next smallest element (e.g., via the right arrow press).

In the multi-zone selection mode shown in FIG. 10A, the surface-based zone creation module 614 provides for assisted navigation with a navigation tracker. Whenever the user hovers an area of the snapshot, the navigation tracker displays multiple elements for a zone based on DOM hierarchy (e.g., per FIG. 4). However, as soon as the user clicks to create these zone(s), the surface-based zone creation module 614 is configured to treat every single element selected by the multi-zone algorithm as separate zone. Moreover, each element has its targets and children retrieved according to area/surface criteria as described above.

In the smart zone selection mode shown in FIG. 10B, the surface-based zone creation module 614 also provides for assisted navigation. However, the smart zone algorithm suggests elements to zone in the snapshot that will reflect certain metric criteria. As soon as the user clicks to create these zone(s), the zone will be created using surface-based zone selection logic (e.g., targets and children of the zone are calculated based on area/surface criteria).

Figure 11:
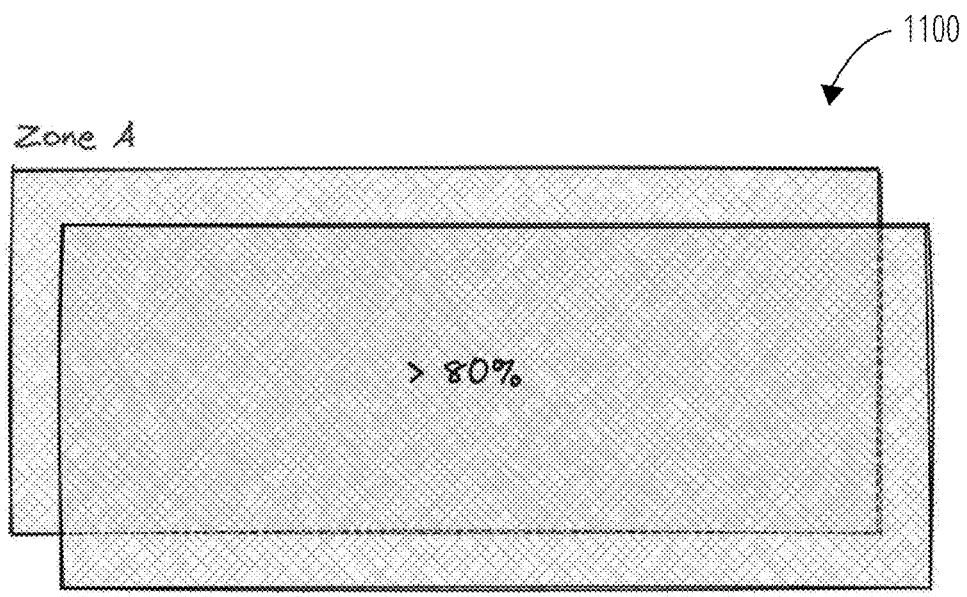
FIG. 11 illustrates an example of identifying parent-child relationships based on overlap and size of the surface area of elements, in accordance with some examples.

FIG. 11 illustrates an example of identifying parent-child relationships based on overlap and size of the surface area of elements, in accordance with some examples. As noted above, the surface-based zone creation module 614 determines that an element is considered as a child if it satisfies all of the following conditions: (1) there is an area overlap between the element and the "parent" element that is greater or equal to a predefined threshold value (e.g., 80%) of its area; (2) the element is smaller than the "parent" element area; and (3) the element is in the same group (e.g., scrollable group or not scrollable group) as the "parent" element with respect to being scrollable group or not scrollable group.

In example embodiments, it is possible to have two zones that satisfy condition (1), but to have the same area such that condition (2) is not met. In such cases, it is difficult to determine which one of these two zones is the parent zone.

Regarding the snapshot 1100 in the example of FIG. 11, the threshold condition (1) is met, but the two zones have the exact same area such that condition (2) is not met. In such a case, no parent-child relationship is determined between zone A and zone B. In order to aggregate metric for zones A and B, the user should have created one of the zones to be larger.

Figure 12:
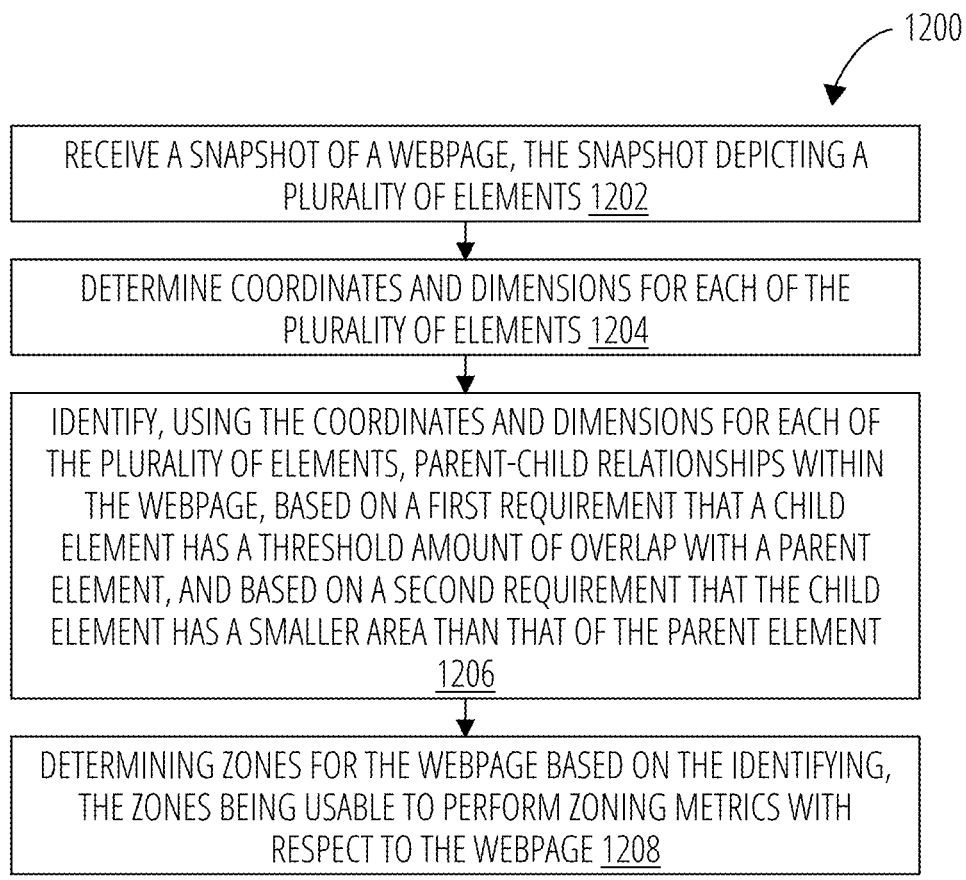
FIG. 12 is a flowchart illustrating a process for surface-based zone creation, in accordance with some examples.

FIG. 12 is a flowchart illustrating a process 1200 for surface-based zone creation, in accordance with some examples. For explanatory purposes, the process 1200 is primarily described herein with reference to the experience analytics script 122 of FIG. 1. However, one or more blocks (or operations) of the process 1200 may be performed by one or more other components, and/or by other suitable devices. Further for explanatory purposes, the blocks (or operations) of the process 1200 are described herein as occurring in serial, or linearly. However, multiple blocks (or operations) of the process 1200 may occur in parallel or concurrently. In addition, the blocks (or operations) of the process 1200 need not be performed in the order shown and/or one or more blocks (or operations) of the process 1200 need not be performed and/or can be replaced by other operations. The process 1200 may be terminated when its operations are completed. In addition, the process 1200 may correspond to a method, a procedure, an algorithm, etc.

The experience analytics script 122 receives a snapshot of a webpage, the snapshot depicting a plurality of elements (block 1202). The experience analytics script 122 determines coordinates and dimensions for each of the plurality of elements (block 1204).

The experience analytics script 122 identifies, using the coordinates and dimensions for each of the plurality of elements, parent-child relationships within the webpage, based on a first requirement that a child element has a threshold amount of overlap with a parent element, and based on a second requirement that the child element has a smaller area than that of the parent element (block 1206). For example, identifying the parent-child relationships is independent of a tree diagram which represents the webpage and which defines second parent-child relationships for the webpage. The threshold amount may be a predefined value that is specific to the snapshot of the webpage.

In example embodiments, identifying the parent-child relationships is further based on a third requirement that the child element and the parent element are both scrollable or both not scrollable. The child element is determined to be scrollable when a scroll height of the child element exceeds a client height of the child element. The parent element is determined to be scrollable when a scroll height of the parent element exceeds a client height of the parent element.

The experience analytics script 122 determines zones for the webpage based on the identifying, the zones being usable to perform zoning metrics with respect to the webpage (block 1208). In example embodiments, the zoning metrics for the elements are aggregated based on determining the zones for the webpage. The zoning metrics may include at least one of click recurrence, hover rate, attractiveness rate, exposure rate, and exposure time.

Machine Architecture

Figure 13:
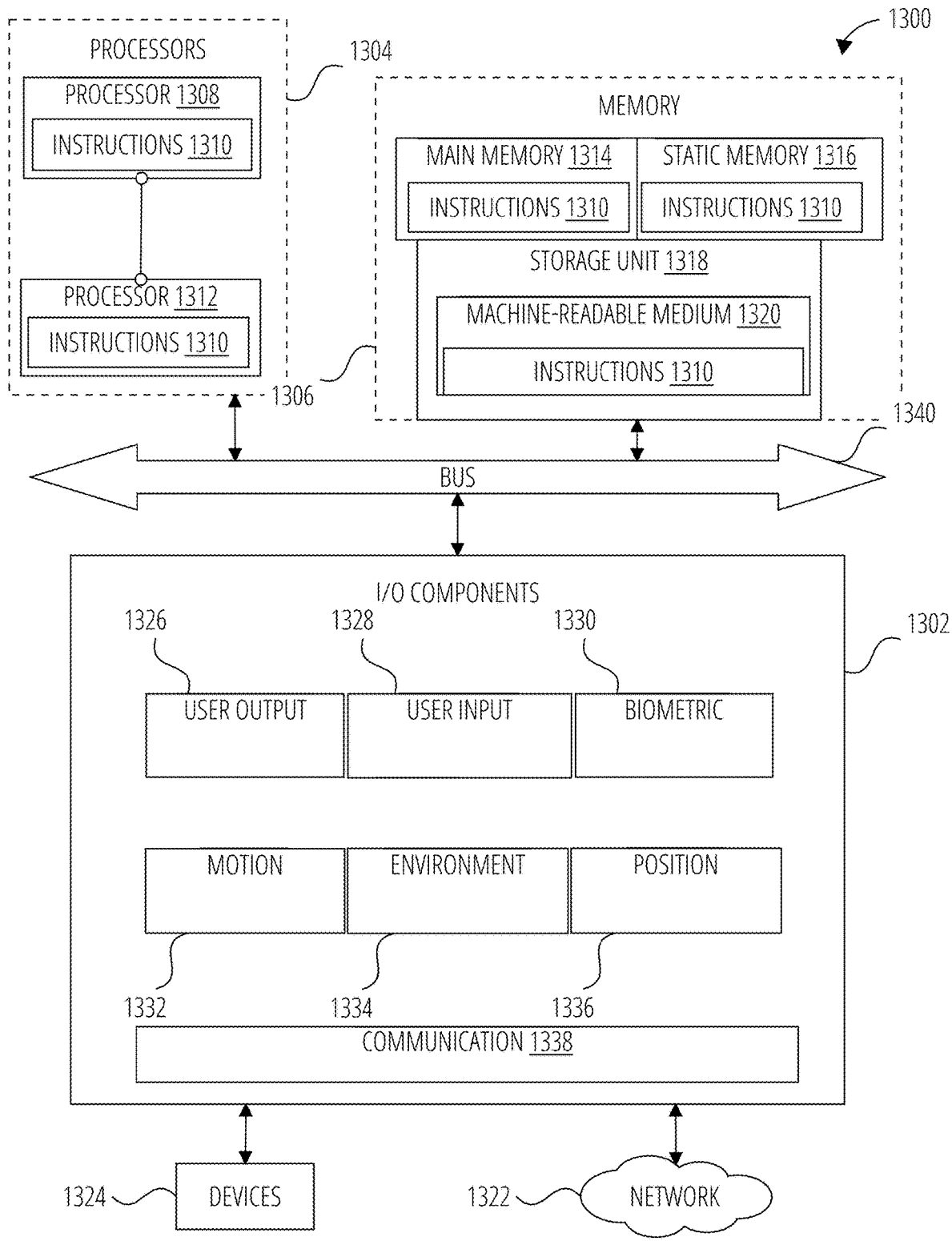
FIG. 13 is a diagrammatic representation of a machine in the form of a computer system within which a set of instructions may be executed for causing the machine to perform any one or more of the methodologies discussed herein, in accordance with some examples.

FIG. 13 is a diagrammatic representation of the machine 1300 within which instructions 1310 (e.g., software, a program, an application, an applet, an application, or other executable code) for causing the machine 1300 to perform any one or more of the methodologies discussed herein may be executed. For example, the instructions 1310 may cause the machine 1300 to execute any one or more of the methods described herein. The instructions 1310 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines that individually or jointly execute the instructions 1310 to perform any one or more of the methodologies discussed herein. The machine 1300, for example, may comprise the member client device 102 or any one of a number of server devices forming part of the experience analytics server 116. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1302, which may be configured to communicate with each other via a bus 1340. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1308 and a processor 1312 that execute the instructions 1310. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1314, a static memory 1316, and a storage unit 1318, both accessible to the processors 1304 via the bus 1340. The main memory 1314, the static memory 1316, and storage unit 1318 store the instructions 1310 embodying any one or more of the methodologies or functions described herein. The instructions 1310 may also reside, completely or partially, within the main memory 1314, within the static memory 1316, within machine-readable medium 1320 within the storage unit 1318, within at least one of the processors 1304 (e.g., within the processor's cache memory), or any suitable combination thereof, during execution thereof by the machine 1300.

The I/O components 1302 may include a wide variety of components to receive input, provide output, produce output, transmit information, exchange information, capture measurements, and so on. The specific I/O components 1302 that are included in a particular machine will depend on the type of machine. For example, portable machines such as mobile phones may include a touch input device or other such input mechanisms, while a headless server machine will likely not include such a touch input device. It will be appreciated that the I/O components 1302 may include many other components that are not shown in FIG. 13. In various examples, the I/O components 1302 may include user output components 1326 and user input components 1328. The user output components 1326 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1302 may include biometric components 1330, motion components 1332, environmental components 1334, or position components 1336, among a wide array of other components. For example, the biometric components 1330 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1332 include acceleration sensor components (e.g., accelerometer), gravitation sensor components, rotation sensor components (e.g., gyroscope).

The environmental components 1334 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 3600 camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 1336 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1302 further include communication components 1338 operable to couple the machine 1300 to a network 1322 or devices 1324 via respective coupling or connections. For example, the communication components 1338 may include a network interface component or another suitable device to interface with the network 1322. In further examples, the communication components 1338 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1324 may be another machine or any of a wide variety of peripheral devices (e.g., a peripheral device coupled via a USB).

Moreover, the communication components 1338 may detect identifiers or include components operable to detect identifiers. For example, the communication components 1338 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1338, such as location via Internet Protocol (IP) geolocation, location via Wi-Fi® signal triangulation, location via detecting an NFC beacon signal that may indicate a particular location, and so forth.

The various memories (e.g., main memory 1314, static memory 1316, and memory of the processors 1304) and storage unit 1318 may store one or more sets of instructions and data structures (e.g., software) embodying or used by any one or more of the methodologies or functions described herein. These instructions (e.g., the instructions 1310), when executed by processors 1304, cause various operations to implement the disclosed examples.

The instructions 1310 may be transmitted or received over the network 1322, using a transmission medium, via a network interface device (e.g., a network interface component included in the communication components 1338) and using any one of several well-known transfer protocols (e.g., hypertext transfer protocol (HTTP)). Similarly, the instructions 1310 may be transmitted or received using a transmission medium via a coupling (e.g., a peer-to-peer coupling) to the devices 1324.

Software Architecture

Figure 14:
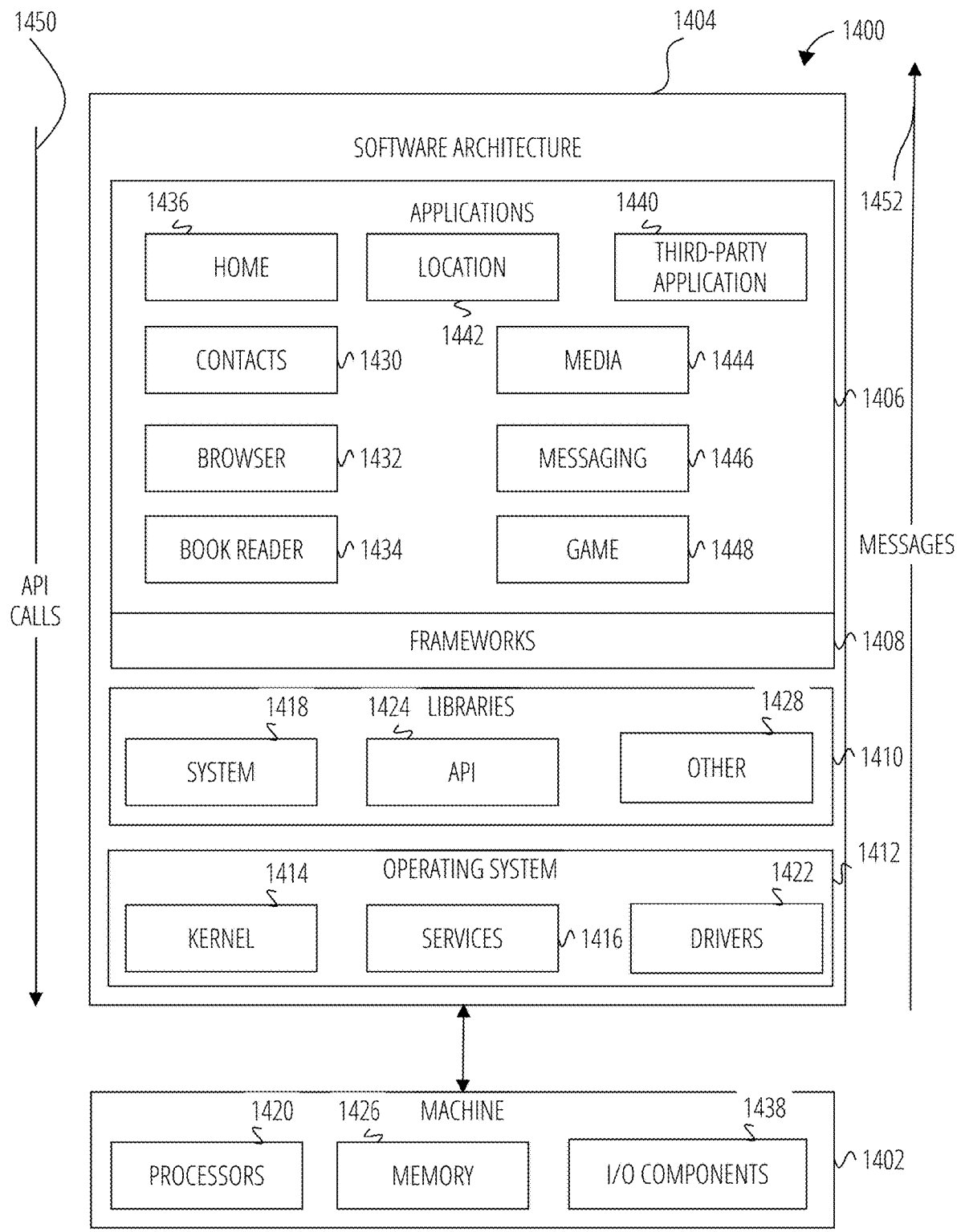
FIG. 14 is a block diagram showing a software architecture within which examples may be implemented.

FIG. 14 is a block diagram 1400 illustrating a software architecture 1404, which can be installed on any one or more of the devices described herein. The software architecture 1404 is supported by hardware such as a machine 1402 that includes processors 1420, memory 1426, and I/O components 1438. In this example, the software architecture 1404 can be conceptualized as a stack of layers, where each layer provides a particular functionality. The software architecture 1404 includes layers such as an operating system 1412, libraries 1410, frameworks 1408, and applications 1406. Operationally, the applications 1406 invoke API calls 1450 through the software stack and receive messages 1452 in response to the API calls 1450.

The operating system 1412 manages hardware resources and provides common services. The operating system 1412 includes, for example, a kernel 1414, services 1416, and drivers 1422. The kernel 1414 acts as an abstraction layer between the hardware and the other software layers. For example, the kernel 1414 provides memory management, processor management (e.g., scheduling), component management, networking, and security settings, among other functionalities. The services 1416 can provide other common services for the other software layers. The drivers 1422 are responsible for controlling or interfacing with the underlying hardware. For instance, the drivers 1422 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1410 provide a common low-level infrastructure used by the applications 1406. The libraries 1410 can include system libraries 1418 (e.g., C standard library) that provide functions such as memory allocation functions, string manipulation functions, mathematic functions, and the like. In addition, the libraries 1410 can include API libraries 1424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1410 can also include a wide variety of other libraries 1428 to provide many other APIs to the applications 1406.

The frameworks 1408 provide a common high-level infrastructure that is used by the applications 1406. For example, the frameworks 1408 provide various graphical user interface (GUI) functions, high-level resource management, and high-level location services. The frameworks 1408 can provide a broad spectrum of other APIs that can be used by the applications 1406, some of which may be specific to a particular operating system or platform.

In an example, the applications 1406 may include a home application 1436, a contacts application 1430, a browser application 1432, a book reader application 1434, a location application 1442, a media application 1444, a messaging application 1446, a game application 1448, and a broad assortment of other applications such as a third-party application 1440. The applications 1406 are programs that execute functions defined in the programs. Various programming languages can be employed to create one or more of the applications 1406, structured in a variety of manners, such as object-oriented programming languages (e.g., Objective-C, Java, or C++) or procedural programming languages (e.g., C or assembly language). In a specific example, the third-party application 1440 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1440 can invoke the API calls 1450 provided by the operating system 1412 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   receiving a snapshot of a webpage, the snapshot depicting a plurality of elements;
   determining coordinates and dimensions for each of the plurality of elements;
   identifying, using the coordinates and dimensions for each of the plurality of elements, parent-child relationships within the webpage, based on a first requirement that a child element has a threshold amount of overlap with a parent element, and based on a second requirement that the child element has a smaller area than that of the parent element; and
   determining zones for the webpage based on the identifying, the zones being usable to perform zoning metrics with respect to the webpage.

2. The method of claim 1, wherein identifying the parent-child relationships is further based on a third requirement that the child element and the parent element are both scrollable or both not scrollable.

3. The method of claim 2, wherein the child element is determined to be scrollable when a scroll height of the child element exceeds a client height of the child element, and
   wherein the parent element is determined to be scrollable when a scroll height of the parent element exceeds a client height of the parent element.

4. The method of claim 1, wherein the zoning metrics for the elements are aggregated based on determining the zones for the webpage.

5. The method of claim 1, wherein the zoning metrics include at least one of click recurrence, hover rate, attractiveness rate, exposure rate, and exposure time.

6. The method of claim 1, wherein identifying the parent-child relationships is independent of a tree diagram which represents the webpage and which defines second parent-child relationships for the webpage.

7. The method of claim 1, wherein the threshold amount is a predefined value that is specific to the snapshot of the webpage.

8. A system comprising:
   at least one processor;
   at least one memory component storing instructions that, when executed by the at least one processor, cause the at least one processor to perform operations comprising:
   receiving a snapshot of a webpage, the snapshot depicting a plurality of elements;
   determining coordinates and dimensions for each of the plurality of elements;
   identifying, using the coordinates and dimensions for each of the plurality of elements, parent-child relationships within the webpage, based on a first requirement that a child element has a threshold amount of overlap with a parent element, and based on a second requirement that the child element has a smaller area than that of the parent element; and
   determining zones for the webpage based on the identifying, the zones being usable to perform zoning metrics with respect to the webpage.

9. The system of claim 8, wherein identifying the parent-child relationships is further based on a third requirement that the child element and the parent element are both scrollable or both not scrollable.

10. The system of claim 9, wherein the child element is determined to be scrollable when a scroll height of the child element exceeds a client height of the child element, and
   wherein the parent element is determined to be scrollable when a scroll height of the parent element exceeds a client height of the parent element.

11. The system of claim 8, wherein the zoning metrics for the elements are aggregated based on determining the zones for the webpage.

12. The system of claim 8, wherein the zoning metrics include at least one of click recurrence, hover rate, attractiveness rate, exposure rate, and exposure time.

13. The system of claim 8, wherein identifying the parent-child relationships is independent of a tree diagram which represents the webpage and which defines second parent-child relationships for the webpage.

14. The system of claim 8, wherein the threshold amount is a predefined value that is specific to the snapshot of the webpage.

15. A non-transitory computer-readable storage medium storing instructions that, when executed by at least one processor, cause the at least one processor to perform operations comprising:
   receiving a snapshot of a webpage, the snapshot depicting a plurality of elements;
   determining coordinates and dimensions for each of the plurality of elements;
   identifying, using the coordinates and dimensions for each of the plurality of elements, parent-child relationships within the webpage, based on a first requirement that a child element has a threshold amount of overlap with a parent element, and based on a second requirement that the child element has a smaller area than that of the parent element; and
   determining zones for the webpage based on the identifying, the zones being usable to perform zoning metrics with respect to the webpage.

16. The non-transitory computer-readable storage medium of claim 15, wherein identifying the parent-child relationships is further based on a third requirement that the child element and the parent element are both scrollable or both not scrollable.

17. The non-transitory computer-readable storage medium of claim 16, wherein the child element is determined to be scrollable when a scroll height of the child element exceeds a client height of the child element, and
   wherein the parent element is determined to be scrollable when a scroll height of the parent element exceeds a client height of the parent element.

18. The non-transitory computer-readable storage medium of claim 15, wherein the zoning metrics for the elements are aggregated based on determining the zones for the webpage.

19. The non-transitory computer-readable storage medium of claim 15, wherein the zoning metrics include at least one of click recurrence, hover rate, attractiveness rate, exposure rate, and exposure time.

20. The non-transitory computer-readable storage medium of claim 15, wherein identifying the parent-child relationships is independent of a tree diagram which represents the webpage and which defines second parent-child relationships for the webpage.

* * * * *

UNITED STATES PATENT AND TRADEMARK OFFICE
CERTIFICATE OF CORRECTION

| | | |
|---|---|---|
| PATENT NO. | : 12,197,526 B1 | Page 1 of 1 |
| APPLICATION NO. | : 18/756965 | |
| DATED | : January 14, 2025 | |
| INVENTOR(S) | : Chamma et al. | |

It is certified that error appears in the above-identified patent and that said Letters Patent is hereby corrected as shown below:

In the Specification

In Column 17, Line 5, delete "3600" and insert --360°-- therefor

Signed and Sealed this
Thirtieth Day of December, 2025

John A. Squires
*Director of the United States Patent and Trademark Office*